Nov. 4, 1930.   H. BURMEISTER   1,780,168
DEVICE FOR DISTRIBUTING FOAM FOR FIRE EXTINGUISHING PURPOSES
Filed Sept. 10, 1927
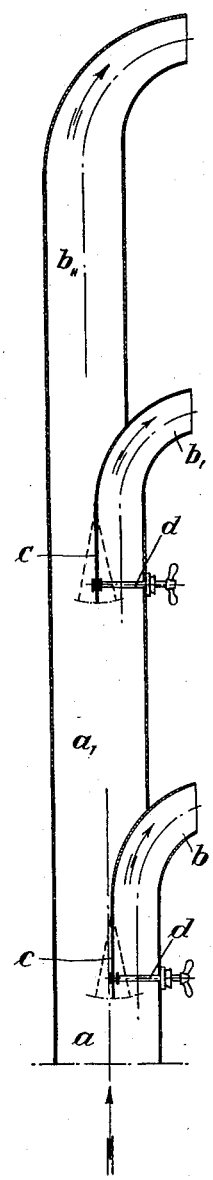

UNITED STATES PATENT OFFICE

HANS BURMEISTER, OF BERLIN, GERMANY, ASSIGNOR TO PYRENE-MINIMAX CORPORATION, A CORPORATION OF DELAWARE

DEVICE FOR DISTRIBUTING FOAM FOR FIRE-EXTINGUISHING PURPOSES

Application filed September 10, 1927, Serial No. 218,808, and in Germany September 25, 1926.

My invention relates to a device for distributing foam for fire extinguishing purposes.

When fire foam was first introduced in the art of fire combating, the foam was produced by mixing two separately stored liquids together, one which contained a foam generator, when the foam was required, whereupon a chemical reaction occurred which led to the formation of the foam. The distribution of the foam over large areas was obtained by mixing the two foam generating liquids together at the place of application and perforated pipe lines or ducts were used through the perforations of which the foam issued shortly after it was formed.

After the fire foam art had been developed further and the chemicals needed for the preparation of the foam were stored in the dry state instead of in the liquid state, the fire foam was as a rule no longer prepared at the place of application, but at a central station or in an apparatus which sometimes was located far from the place of application.

When the foam is formed at a point remote from the place of application it must be conveyed through long pipe lines and subsequently distributed in a suitable manner. Considerable difficulty has been experienced in the past in properly distributing the foam under these circumstances from ordinary pipe lines and by ordinary distributing means.

The foam, depending upon the purpose for which it is needed, must sometimes be in a thin, easily flowing state and at other times in a thick viscous state, which has added materially to the problem of its satisfactory distribution. Furthermore, due to the viscosity of the foam the laws applying to the distribution of water from pipe lines are inapplicable to the distribution of foam.

The principal object of my invention is to overcome these difficulties by controlling the distribution of the foam by very simple means at the place of application.

I employ a distributing duct, preferably of gradually decreasing cross-sectional area, provided at the place of application of the foam with one or more branches in the form of spouts. These branches are provided at their inlets with adjustable valve members or dampers which, according to the adjustment, determine the size of the inlet opening of the branch pipes and control the quantity of foam which will be admitted. The said valve members may also be adjusted so as to extend beyond the inlet openings of the branch pipes and will then function to obstruct the flow of foam in the duct.

The accompanying drawing is a longitudinal section of a preferred form of my invention.

Referring thereto, $a$ is the distributing duct or pipe which is provided with the branches $b$, $b'$ and $b''$ which are in the form of spouts. The duct $a$ decreases in cross-sectional area from the point where the foam is admitted thereto to the portion or branch $b''$.

The quantity of foam supplied to the several branches is controlled by means of the adjustable valve members or dampers $c$, which may be adjusted by the screws $d$, as indicated by the broken-line positions of the said valve members. In operation the valve members $c$ are adjusted according to the viscosity of the foam and the length and spacing of the branches, so that each branch will expel substantially the same quantity of foam. If necessary to accomplish this result the valves $c$ may, for example, be adjusted so as to extend beyond the inlet openings of the branch pipes so as to reduce the quantity of foam which will pass to the next succeeding branch or branches as the case may be.

I claim as my invention:

1. A fire foam distributing device comprising a duct with a plurality of foam outlets spaced along the length thereof, each outlet having a chamber projecting into the duct and adjustable to direct more or less foam to the outlet, the cross-sectional area of the duct being reduced in steps at the outlets.

2. A fire foam distributing device comprising a duct, branch outlets spaced along said duct, said outlets having portions extending into said duct and having foam receiving openings substantially perpendicular to the axis of said duct, and means for variably cutting off said openings to regulate the flow of foam through said outlets.

3. A fire foam distributing device comprising a duct, branch outlets spaced along said duct, each of said outlets being of substantially uniform cross sectional area throughout and having a portion extending into said duct with a foam receiving opening substantially perpendicular to the axis of the duct, and an adjustable damper adapted to reduce the effective size of said opening.

4. A fire foam distributing device comprising a duct, branch outlets spaced along said duct, said duct having progressively reduced cross sectional area at the successive outlets from the intake end of the duct toward the opposite end, each of said outlets being of substantially uniform cross sectional area throughout and having a portion extending into said duct with a foam receiving opening substantially perpendicular to the axis of the duct, and an adjustable damper adapted to reduce the effective size of said opening.

5. A fire foam distributing device comprising a duct, branch outlets spaced along said duct, each of said outlets being of substantially uniform cross sectional area throughout and having a portion extending into said duct with a foam receiving opening substantially perpendicular to the axis of the duct, an adjustable damper adapted to reduce the effective size of said opening, and means including a threaded rod extending through the wall of the duct for adjusting said damper to suit the varying conditions.

HANS BURMEISTER.